United States Patent [19]

Hicks

[11] Patent Number: 6,082,881
[45] Date of Patent: Jul. 4, 2000

[54] VANITY LIGHT FOR REARVIEW MIRROR

[75] Inventor: Thomas S. Hicks, Livonia, Mich.

[73] Assignee: Lear Automotive Dearborn, Inc., Southfield, Mich.

[21] Appl. No.: 09/100,044

[22] Filed: Jun. 19, 1998

[51] Int. Cl.[7] ....................................... B60B 1/12
[52] U.S. Cl. .................. 362/503; 362/135; 362/83.1; 362/494; 362/142; 362/143
[58] Field of Search ..................... 362/494, 464, 362/142, 143, 135, 136, 137, 503

[56] References Cited

U.S. PATENT DOCUMENTS 5,671,996  9/1997  Bos et al. ................................ 362/140
5,906,424  5/1999  Peterson .................................. 362/135

*Primary Examiner*—Sandra O'Shea
*Assistant Examiner*—Anabel Ton
*Attorney, Agent, or Firm*—MacMillan, Sobanski & Todd, LLC

[57] ABSTRACT

A vehicular rearview mirror assembly includes a mirror housing, a mirror, and a light assembly. The light assembly is supported within a channel in the mirror housing for slidable movement from a retracted position behind the mirror to an extended position adjacent the mirror. The light assembly includes a light housing and a light emitting device adapted to provide sufficient light to illuminate the face of a user. The light assembly is operatively connected to a switch which prevents the light emitting device from operating unless the vehicle transmission is in a park setting.

15 Claims, 2 Drawing Sheets

VANITY LIGHT FOR REARVIEW MIRROR

BACKGROUND OF THE INVENTION

The present invention relates to a mirror incorporating an illuminating device.

Many automobiles today include a vanity mirror disposed on a backside of a sun visor. In order to use the mirror, the sun visor must be pivoted from a retracted position adjacent the roof of the passenger compartment to an extended position adjacent the windshield. Many drivers prefer that the sun visor also include a pocket or an elastic strap to store items such as parking access cards, automobile registration and insurance information, and the like. However, storing these items on the sun visor can interfere with the use of the vanity mirror.

A light is also frequently mounted to the sun visor adjacent the vanity mirror to allow the vanity mirror to be used at night. The light is fixed in position adjacent the vanity mirror and cannot be conveniently stowed after use, increasing the size of the vanity mirror/light assembly.

SUMMARY OF THE INVENTION AND ADVANTAGES

The present invention provides a light assembly slidably retained within a channel in a mirror housing to allow the light assembly to be conveniently stowed after use. More specifically, the light assembly is adapted to slide from an extended position adjacent the mirror to a retracted position behind the mirror to hide the light assembly. The light assembly includes a light emitting device, such as a light bulb, which is adapted to provide sufficient light to illuminate the face of a user.

In a further aspect of this invention, the light assembly can be slidably retained within the housing of a vehicular rearview mirror. As stated above, the light assembly is adapted to slide from a hidden, retracted position behind the mirror to an extended position adjacent the mirror. Thus, the rearview mirror can be used as a vanity mirror without the inconvenience of pivoting the sun visor to gain access to the mirror. The sun visor can then still be used as a storage location for parking cards, vehicle documentation, and the like without interfering with the vanity mirror. Further, the light assembly can be retracted behind the mirror to avoid interference with the field of view through, the windshield.

In another feature of the invention, the light assembly is operatively connected to a switch which only allows the light assembly to operate when the vehicle transmission is in a park setting.

These and other features of the present invention can be best understood from the following specification and drawings.

DETAILED DESCRIPTION OF THE PREFERRED EMBODIMENT

Figure 1:
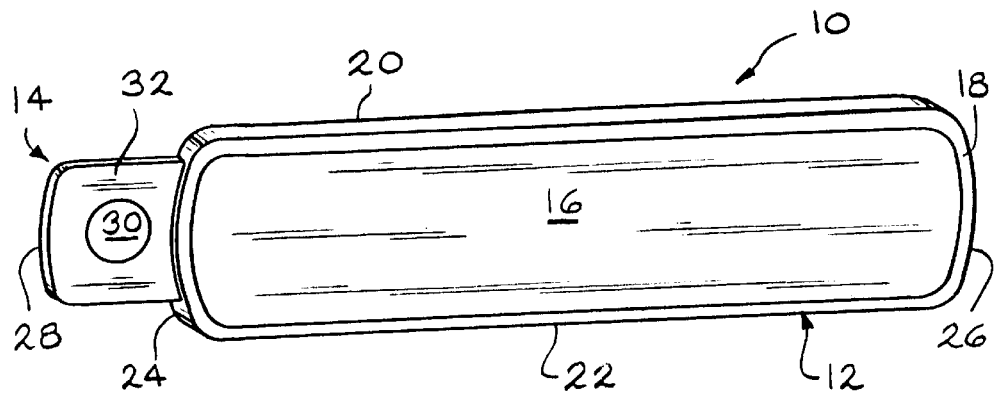
FIG. 1 is a front view of a mirror including a slidable light assembly in an extended position.

The present invention is generally shown at 10 in FIGS. 1–4 and includes a vehicular rearview mirror assembly 12 incorporating a light assembly 14. As shown in FIG. 1, the mirror assembly 12 includes a mirror 16 supported within a mirror housing 18. The light assembly 14 is slidably retained within the mirror housing 18 to slide from an extended position adjacent the mirror 16 (shown in FIGS. 1 and 2) to a retracted position behind the mirror 16 (shown in FIG. 3). As shown in FIG. 1, the mirror housing 18 is generally rectangular and includes top and bottom horizontal edges 20,22 and left and right vertical side edges 24,26.

As shown in FIG. 1, the light assembly 14 is generally rectangular and includes a light housing 28 surrounding a light source 30. Although the light source 30 can comprise any type of light producing device, in the preferred embodiment the light source 30 comprises a low voltage (e.g., 10 watt) incandescent bulb. A frosted lens 32 protects the light source 30 and diffuses the light directed toward the face of a user. The light source 30 is automatically turned on when the light housing 28 is moved to the extended position shown in FIGS. 1 and 2, and is automatically turned off when the light housing 28 is moved to the retracted position shown in FIG. 3. The controls necessary to achieve this on/off state based on position are well within the skill of a worker in this art, and any of several switch arrangements could be used. The light source 30 can either be hard wired or powered from a sliding electrical contact between the light housing 28 and the mirror housing 18.

Figure 2:
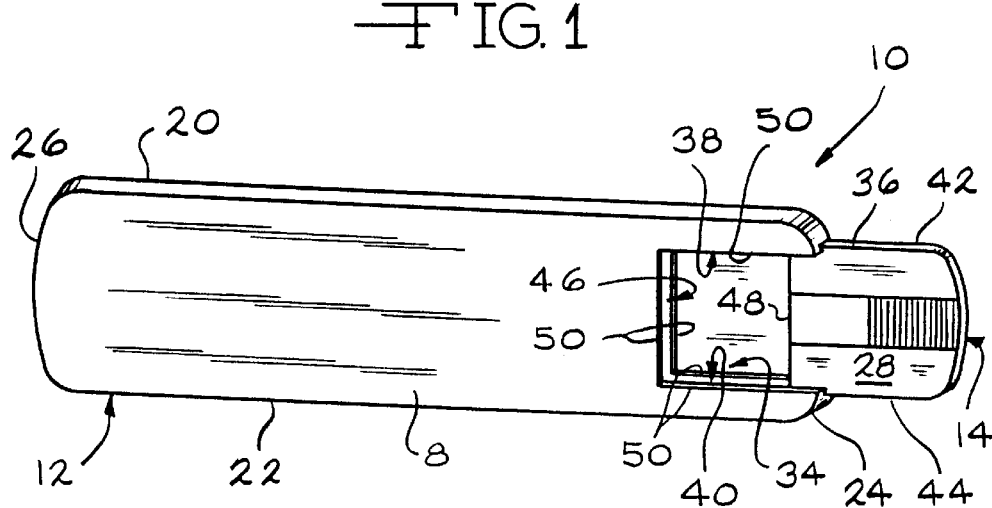
FIG. 2 is a rear view of the mirror including the slidable light assembly in an extended position.
Figure 3:
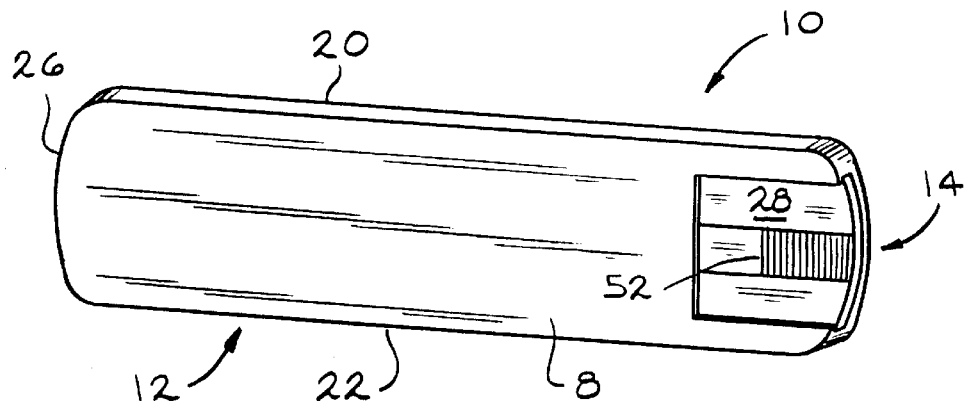
FIG. 3 is a rear view of the mirror including the light assembly in a retracted position.

As shown in FIG. 2, the mirror housing 18 defines a channel 34 which supports the light assembly 14 for slidable movement. The channel 34 includes an entry 36 in the left side edge 24 of the mirror housing 18 and extends along approximately one-fourth of the length of the mirror housing 18. The channel 34 includes top and bottom horizontal grooves 38,40 adapted to receive, respectively, top and bottom edges 42,44 of the light assembly 14. The channel 34 also includes a vertical groove 46 adapted to receive a side edge 48 of the light assembly 14. Each groove 38,40, and 46 is defined by a pair of upwardly extending ridges 50 which are spaced apart a distance approximately equal to the thickness of the light assembly 14.

As shown in FIG. 2, the light housing 28 includes a gripping surface 52 comprising a plurality of parallel ridges adapted to permit a user to securely grasp the light housing 23. The light housing 28 also includes tabs or prongs (not shown) which extend within the channel 34 to prevent the light housing 28 from being completely removed from the channel 34.

Figure 4:
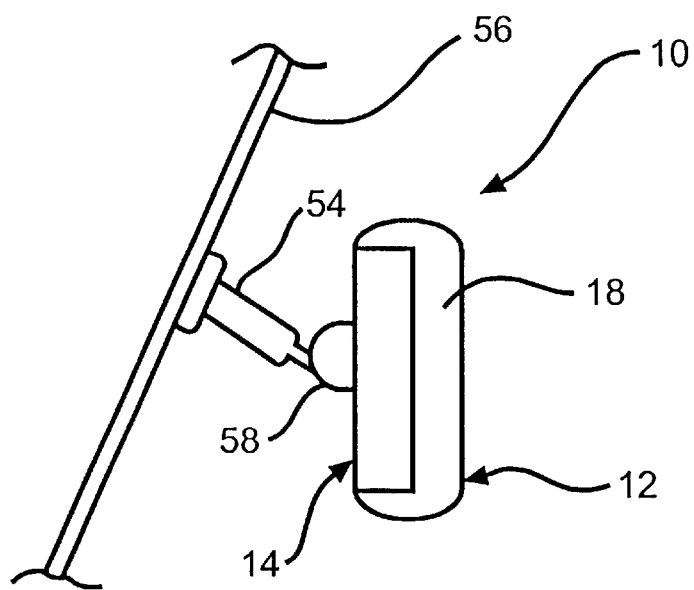
FIG. 4 is a side view of the mirror mounted to a windshield.

As shown in FIG. 4, the mirror assembly 12 includes a mounting stem 54 adapted to mount the mirror assembly 12 to a vehicular windshield 56. The mounting stem 54 is joined to the mirror housing 18 by a ball joint 58 which permits the orientation of the mirror assembly 12 to be pivotally adjusted. As know, the rearview mirror is preferably mounted to the windshield at a generally central location in the windshield.

Figure 5:
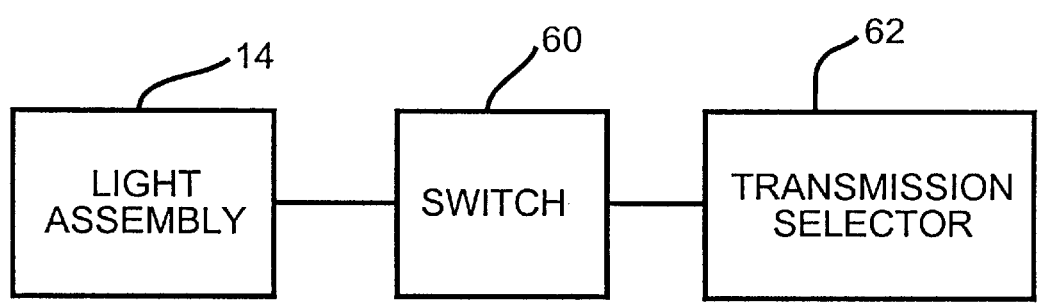
FIG. 5 is a schematic illustration of the light assembly operatively engaged with a switch connected to the vehicle transmission selector.

As shown schematically in FIG. 5, the light assembly 14 is preferably operatively engaged with a switch 60 which is closed only when the transmission selector 62 (i.e., the shift control lever) in the vehicle is in a park setting. In this manner, users will not be able to use the light source 30 while the vehicle is in operation, and will be less tempted to use the mirror 16 as a vanity mirror during operation of the vehicle.

A preferred embodiment of this invention has been disclosed. However, a worker of ordinary skill in the art would recognize that certain modifications come within the scope of this invention. For that reason, the following claims should be studied to determine the true scope and content of this invention.

What is claimed is:

1. A mirror assembly comprising:

a mirror housing;

a mirror supported by said mirror housing; and a light assembly supported by said mirror housing for slidable movement relative to said mirror, wherein said light assembly is adapted to slide from a retracted position behind said mirror to an extended position adjacent to said mirror.

2. The mirror assembly of claim 1 wherein said mirror housing includes a channel adapted to receive said light assembly and support said light assembly for slidable movement.

3. The mirror assembly of claim 1 wherein said light assembly includes a light housing and a light emitting device supported by said light housing.

4. The mirror assembly of claim 3 wherein said light emitting device comprises a low voltage light bulb adapted to produce sufficient light to illuminate the face of a user.

5. The mirror assembly of claim 3 wherein said light emitting device is operatively engaged with a switch which allows said light emitting device to operate only when a vehicular transmission is in a park setting.

6. A vehicular rear-view mirror assembly comprising:

a mirror housing mounted at a generally central location on a front windshield of a vehicle;

a mirror supported by said mirror housing;

a light assembly supported by said mirror housing including a light emitting device and a light housing; and said light emitting device being adapted to produce sufficient light to illuminate the face of a user.

7. The mirror assembly of claim 6 wherein said light assembly is slidably received within a channel in said mirror housing and said channel is adapted to guide said light assembly from a retracted position behind said mirror to an extended position adjacent to said mirror.

8. The mirror assembly of claim 7 wherein said mirror is mounted to a vehicular windshield and said light emitting device is operatively engaged with a switch which allows said light emitting device to operate only when a vehicular transmission is in a park setting.

9. The mirror assembly of claim 6 wherein said light emitting device comprises a low voltage light bulb.

10. A vehicle and rear-view mirror assembly comprising:

a vehicle including a front windshield;

a mirror housing, mounted at a generally central location on said windshield;

a mirror supported by said mirror housing;

a light assembly supported by said mirror housing for slidable movement relative to said mirror; and said light assembly including a light emitting device and a light housing.

11. The assembly of claim 10 wherein said light emitting device is adapted to produce sufficient light to illuminate the face of a user.

12. The assembly of claim 10 wherein said mirror housing includes a channel adapted to receive said light assembly and support said light assembly for slidable movement from a retracted position behind said mirror to an extended position adjacent said mirror.

13. The assembly of claim 10 wherein said mirror is mounted to a vehicular windshield.

14. A mirror assembly comprising:

a mirror housing including a mounting stem adapted to mount said mirror housing to a vehicular windshield;

a mirror supported by said mirror housing; and a light assembly supported by said mirror housing for slidable movement relative to said mirror.

15. A mirror assembly comprising:

a mirror housing mounted to a vehicular windshield;

a mirror supported by said mirror housing; and a light assembly supported by said mirror housing for slidable movement relative to said mirror.

* * * * *